United States Patent [19]
Bowersock

[11] Patent Number: 5,930,937
[45] Date of Patent: *Aug. 3, 1999

[54] APPARATUS FOR INJECTING OBJECTS INTO ARTIFICIAL FISHING LURES

[76] Inventor: Bruce David Bowersock, 3676 S. 57th Ave., Greenacres, Fla. 33463

[ * ] Notice: This patent issued on a continued prosecution application filed under 37 CFR 1.53(d), and is subject to the twenty year patent term provisions of 35 U.S.C. 154(a)(2).

[21] Appl. No.: 08/641,285

[22] Filed: Apr. 30, 1996

[51] Int. Cl.$^6$ .................................................. A61M 5/00
[52] U.S. Cl. .............................................. 43/4.5; 43/42.31
[58] Field of Search .................... 43/4, 42.31; 227/66, 227/67

[56] References Cited

U.S. PATENT DOCUMENTS

| | | |
|---|---|---|
| 3,403,466 | 10/1968 | Young . |
| 3,572,335 | 3/1971 | Robinson . |
| 3,802,115 | 4/1974 | Auten et al. . |
| 3,815,798 | 6/1974 | Lavitch et al. ............... 227/67 X |
| 3,893,612 | 7/1975 | Bone ............................. 227/67 |
| 3,988,851 | 11/1976 | Sacharnoski, Sr. .......... 43/42.31 |
| 4,086,914 | 5/1978 | Moore . |
| 4,203,246 | 5/1980 | Sacharnoski, Sr. . |
| 4,597,753 | 7/1986 | Turley ......................... 227/67 X |
| 4,834,704 | 5/1989 | Reinicke . |
| 4,900,303 | 2/1990 | Lemelson . |
| 4,988,335 | 1/1991 | Prindle et al. .............. 227/67 X |
| 5,142,811 | 9/1992 | Freeman . |

Primary Examiner—Joseph J. Hail, III
Assistant Examiner—Anthony Ojini
Attorney, Agent, or Firm—Malin, Harley, DiMaggio & Crosby, P.A.

[57] ABSTRACT

A hand-held device for injecting an object, such as a rattling device or weight, into an artificial fishing lure. The device comprises a grasping means for ease of manipulation, a tip for holding an object, said tip having a sharpened end for piercing an artificial lure, means for ejecting the object such that the object remains at least partially embedded within the lure.

6 Claims, 5 Drawing Sheets

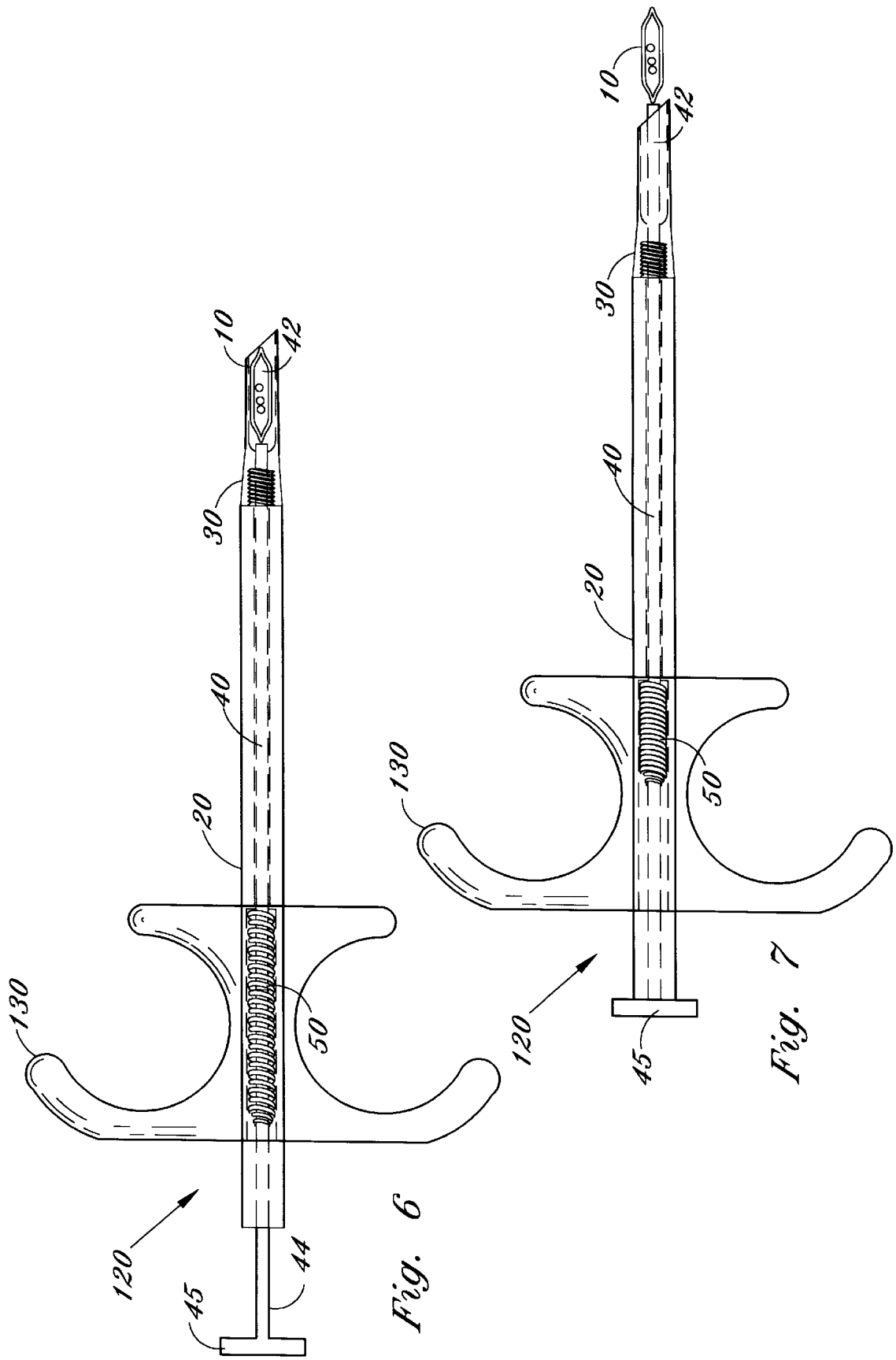

1

APPARATUS FOR INJECTING OBJECTS INTO ARTIFICIAL FISHING LURES

BACKGROUND OF THE INVENTION

1. Field of the Invention

The present invention relates to artificial fishing lures and associated devices, and more particularly, to a device for injecting objects, such as rattling devices and weights, into artificial fishing lures.

2. Description of the Prior Art

While live fishing bait is normally the most desirable, and possibly the most effective, lure for catching fish, the use of artificial fishing lures has gained wide acceptance among sport fishermen. Artificial lures, such as plastic worms, are well known in the art for simulating the appearance of live bait. Furthermore, sport fishermen have found it desirable to modify artificial lures for the purpose of enhancing the attractiveness of the lures to fish.

Artificial lure enhancements have taken many forms. For example, U.S. Pat. No. 5,142,811 issued to Freeman discloses a fishing lure and lure enhancement kit having a fishing lure comprising a soft plastic body with an elongated passage extending therethrough. An elongated tubular casing is received in the passage and includes a bore having an open leading end and an open trailing end. Freeman contemplates that the bore defined by the tubular casing provides a flow path for water through the interior of the lure body as the lure is pulled through the water thereby imparting a fish attracting noise and movement thereto. In an alternate embodiment, Freeman teaches a replaceable dispenser of fish attractant received in the bore such that water flowing through the bore effectively discharges an amount of fish attractant behind the lure.

U.S. Pat. No. 3,403,466 issued to Young discloses an article for injecting fish-attractant into bait. Young teaches injecting foreign matter, such as air and/or a mixture of air and fish attractant, into the internal digestive tract of a live worm for preventing the worm from sinking to the bottom of a body of water. Injecting air into a natural worm increases the buoyancy of the worm thereby properly positioning the worm at an approximate height above the bottom. Young discloses a bottle incorporating a hypodermic needle having a beveled leading end to facilitate penetration of the needle. Once inserted, the bottle is squeezed by the user to force air out of the bottle thereby inflating the worm.

Another common means of enhancing artificial lures includes the association of a noise making or rattling device with the lure. Such devices are commonly referred to as "lure rattles" or "worm rattles" (hereinafter "rattling device"). Typical of these prior art rattling devices are the devices disclosed in U.S. Pat. Nos. 3,988,851 and 4,203,246 issued to Sacharnoski, Sr. Sacharnoski discloses a capsule comprising a glass tube with closed ends containing a plurality of free spherical balls, preferably metal, for association with a fishing lure to produce clear, resonant sounds that attract fish to the lure without materially affecting the attitude of the lure or its course within or through the water. Such devices, provide a simple and inexpensive sound-producing means that is adapted to be easily and effectively attached to or embedded in the body of an artificial fishing lure of any type or nature for the purpose of producing clear, resonant sounds within the water as the lure is moved through the water, thereby attracting fish.

In order to maintain the external physical appearance of the lure, the vast majority of fishermen insert rattling devices directly into the soft body of lure. The insertion of such a rattling device into a fishing lure thus produces clicking sounds so as to entice fish to the lure without materially affecting the external appearance of the lure, its attitude, position or course within or through the water.

Prior art rattling devices typically comprise a glass capsule housing a plurality of small, spherical bodies, such as metal balls or shot. Preferably, the tubular capsule is drawn from hard glass tubing, such as commercially available Pyrex® glass. The shot-containing tube may be attached to or embedded within the body of a lure of any type or nature in a way so that it has no material effect on the movements of the lure within the water, but so that the balls produce a clear, resonant, clicking sound that has a decided and sufficient loudness, pitch, and quality of character to attract fish to the lure. The use of glass is of importance not only due to the fact that such material is corrosion resistant and is easy and inexpensive to work with in fabricating, but also because the glass, due to the physical characteristics and properties thereof, creates louder and clearer sounds with greater fish-enticing pitch and quality than would be realizable with metal, plastic, or other materials.

In one example, a rattling device is produced using conventional Pyrex® glass tubing drawn to a tube wall thickness of about ¼ to ½ millimeter, with an outside diameter of 3 to 4 millimeters. The tubing is severed to produce small tubes housing metallic balls therein. The resultant tubes are ½ to ¾ inches in length and enclose a plurality of no. 8 or no. 9 shot, the ends of the tubes being sealed as by heating and crimping.

As disclosed by Sacharnoski, the common method of inserting a rattling device includes hand insertion by the user. For example, in FIG. 4 of each of Sacharnoski's patents, there is depicted what the applicant submits is the current state of the art for fishing lure rattling device insertion. Sacharnoski teaches using a sharp tool T that can be forced in a portion of a soft artificial lure thereby forming a starter hole. Thereafter, the user must force an end of the rattling device into the starter hole and then, push the rattle into the body of the lure using only his hands.

There are, however, a number of readily apparent disadvantages with inserting fishing lure rattling devices as taught by Sacharnoski. Firstly, as previously mentioned, the rattling devices are often relatively small, being approximately ½ inch in length and having an outside diameter of approximately 4 millimeters. Therefore, the devices are difficult to manipulate, particularly for those suffering from disorders affecting the hands and joints. Secondly, since the rattling devices are typically fabricated from thin Pyrex glass, there is a danger that the user may accidently crush the device and consequently suffer severe cuts to his/her fingers and hands. Lastly, hand insertion does not permit precise positioning of the device within the lure thereby degrading the performance of the lure in the water.

Similarly, U.S. Pat. No. 3,802,115 issued to Auten et al. discloses a noise making fishing lure made by inserting a glass container having at least one metal ball loosely contained therein into the body of a soft plastic fishing lure. Auten et al. teach forming a cavity within the artificial lure by using a cylindrical configured elongated member. The lure rattle is then inserted by the user initially placing the rattle partially into the cavity with his or her hand then contacting the rattle with the elongated member so as to completely position and force the rattle into the cavity by using the elongated member as a ram rod. Auten et al's method, however, fails to overcome the aforementioned disadvantages associated with the insertion of rattling devices into artificial fishing lures.

Thus, there exists a need for a device for precisely inserting rattling devices into artificial fishing lures while overcoming the attendant disadvantages present in the art. It is, therefore, to the effective resolution of the aforementioned problems and shortcomings that the present invention is directed toward.

SUMMARY OF THE INVENTION

The present invention contemplates an article for inserting lure enhancing packages, and particularly rattling devices, into the body of a soft artificial fishing lure. The invention comprises a hand-held tool including a means for grasping, a means for piercing the body of an artificial lure, and a means for injecting an object (e.g. rattling device) into the lure, quickly, easily, safely, and precisely.

The device comprises means for injecting including an elongated hollow shaft having first and second ends and an external grasping means disposed thereon. The shaft first end terminates in a threaded portion for receiving a removable piercing means thereon and in threaded engagement therewith. The means for piercing comprises an injection tip defining an aperture therethrough and includes an open end portion which functions to receive and hold a rattling device, and further functions to provide a sharp edge for piercing the body of an artificial lure. A push rod is received axially within said hollow shaft and said injection tip such that a one rod end is positioned proximate said injection tip, and the opposite rod end extends beyond the hollow shaft second end. The push rod is biased to a retracted position and movable to an extended position by the user applying force to the rod end.

The device is used for inserting and injecting objects, such as a rattling device, into soft bodies, such as an artificial fishing lure by: (1) grasping the injection device; (2) selecting and threadably attaching the appropriate injection tip on the hollow shaft first end; (3) placing an object into the injection tip; (4) piercing an artificial fishing lure with the injection tip; (5) withdrawing the injection tip while the user simultaneously applies pressure to the push rod whereby the push rod is moved to its extended position thereby ejecting the object from the injection tip and into the fishing lure.

In a first embodiment, the device of the present invention comprises a grasping means configured in the shape of a gun. In this embodiment, the elongated hollow shaft functions as the gun barrel and the user ejects a rattling device by pulling the trigger which acts on the push rod thereby moving the push rod to its extended position for ejecting the rattle device. The handle of the gun-shaped embodiment may function as a storage compartment for housing various components including rattle devices and various sized injection tips.

In an alternate embodiment, the means for grasping includes an external finger grip fixedly mounted on the shaft thereby forming a syringe like injecting device.

Therefore it is an object of the present invention to provide a device for ejecting objects.

It is a further object of the present invention to provide a device for quickly and easily ejecting objects into artificial fishing lures.

Still another object of the present invention is to provide a hand-held device for use with artificial fishing lure enhancing objects for precisely depositing said objects within an artificial fishing lure such that the object remains embedded within the body of the lure.

Yet another object of the instant invention is to provide a hand-held device for injecting a noise producing rattle into an artificial fishing lure.

In accordance with these and other objects which will become apparent hereinafter, the instant invention will now be described with particular reference to the accompanying drawings.

BRIEF DESCRIPTION OF THE DRAWINGS

FIG. 6 depicts an alternate embodiment of the present invention with the ejecting rod in a retracted position.

FIG. 7 depicts an alternate embodiment of the present invention with the ejecting rod in an extended position.

DESCRIPTION OF THE PREFERRED EMBODIMENTS

Figure 1:
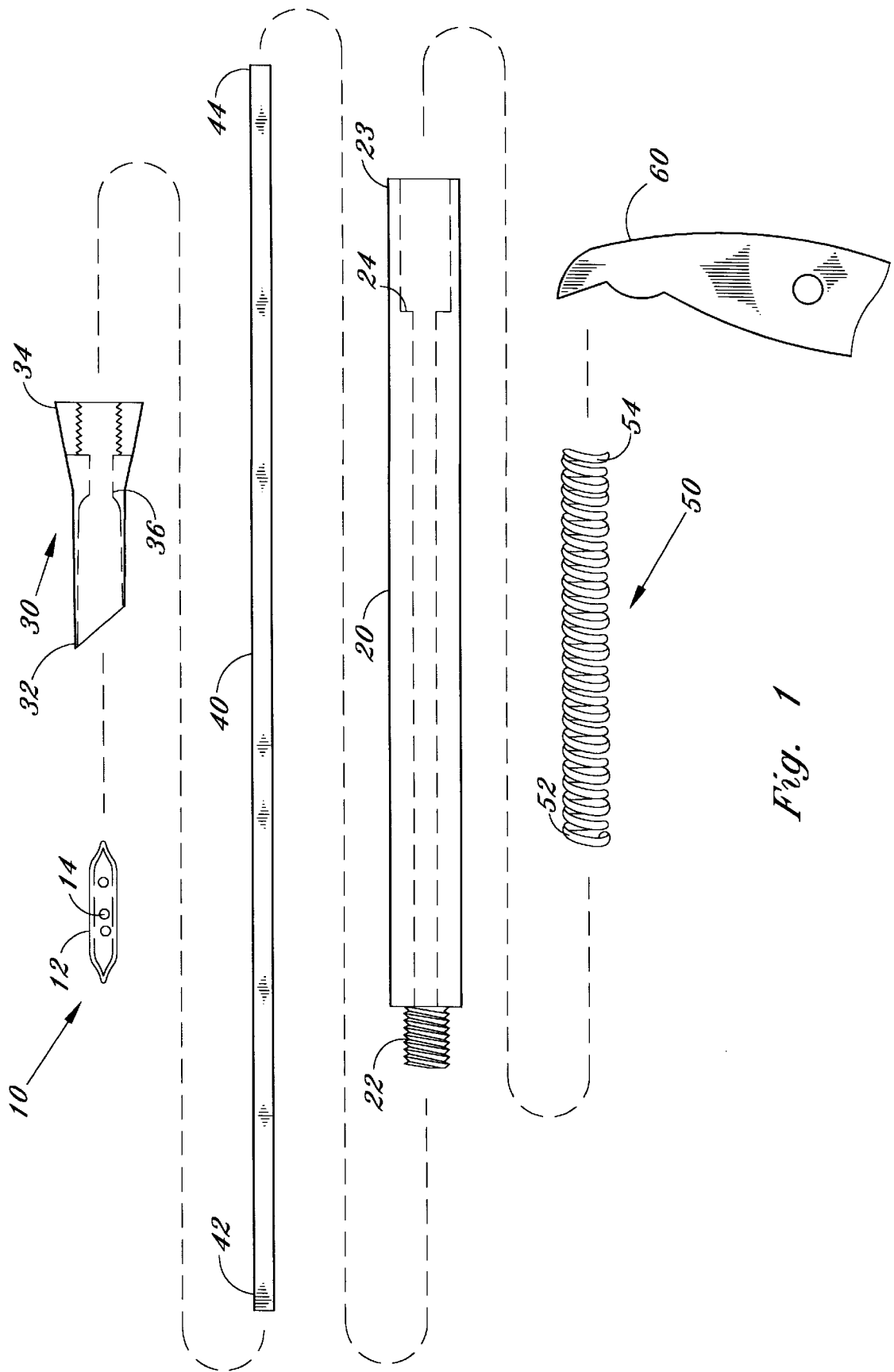
FIG. 1 depicts a partial exploded view of the ejecting components of the present invention.

Turning now to the drawings, and first to FIG. 1, there is disclosed an object such as a prior art rattling device, generally referenced as 10, and a partial exploded view of the working ejection components of the instant invention for use with artificial fishing lures. Rattling device 10 comprises a cylindrical housing 12, which is sealed at each end and contains at least one freely rolling spherical member 14 enclosed therein.

The rattling device 10 is commonly used in connection with an artificial fishing lure for enhancing the lure by inserting the rattling device 10 into the lure such that the imbedded device creates noise, for attracting fish, when moved through the water. However, the prior art method for inserting such rattling devices, as well as other objects such as metal weights, fish attractant etc., consists of the user forcing a device into a soft artificial lure by hand, using primarily the finger tips.

Accordingly, the present invention is directed to a device for injecting objects such as rattling devices and the like. With reference again to FIG. 1 there is depicted a system for ejecting and inserting a rattling device 10, or other object such as a metal weight. The system includes an elongated hollow shaft 20 having a male threaded end portion 22 and an opposing end 23 having an interior wall which defines an interior shoulder 24.

An injection tip, generally referenced as 30 is also depicted. Tip 30 includes a female threaded end portion 34 for mating engagement with shaft end portion 22. Accordingly, threaded end portion 22 receives an injection tip 30, removably mounted thereon. However, while in the preferred embodiment, the attachment of tip 30 to shaft 20 is by threaded engagement, it is contemplated that any suitable means of attachment is considered an equivalent.

Tip 30 includes a piercing end 32, a female threaded mounting end 34, and defines an aperture extending therethrough. Tip 30 has an interior wall forming a shoulder 36 which defines an aperture of reduced diameter disposed between said ends for reasons that will soon become apparent. Piercing end 32 is preferably beveled and sharp to facilitate puncturing of the body of an artificial fishing lure. Prior to actual use a rattling device 10 is axially received within tip 30 by insertion at piercing end 32.

A push rod 40, having a first end 42 and a second end 44, is movably received in, and in axial alignment with, hollow shaft 20 and tip 30. Rod first end 42 may comprise an enlarged portion which, when in the retracted position, would be disposed between piercing end 32 and the tip wall shoulder 36 as to bear on shoulder 36 which thereby forms a stop with respect to further retraction. Rod 40 is biased by a biasing means, such as a helical coil spring 50, such that rod first end 42 is normally retracted within tip 30 to a position proximate shoulder 36. Spring 50 includes opposing ends, 52 and 54 respectively. Rod 42 is received within helical spring 50 such that spring 50 is disposed about rod 42 proximate rod end 44. Spring 50 is at least partially received within hollow shaft 20 such that spring end 52 bears against shaft shoulder 24. Opposing spring end 54 is attached to rod 40.

An actuating means 60 includes a portion for bearing against rod end 44 for selectively moving rod 40 from its retracted position, wherein rod end 42 is positioned proximate tip shoulder 36, to an extended position, wherein rod end 42 is positioned spaced from tip shoulder 36 in the direction of end 32.

Figure 2:
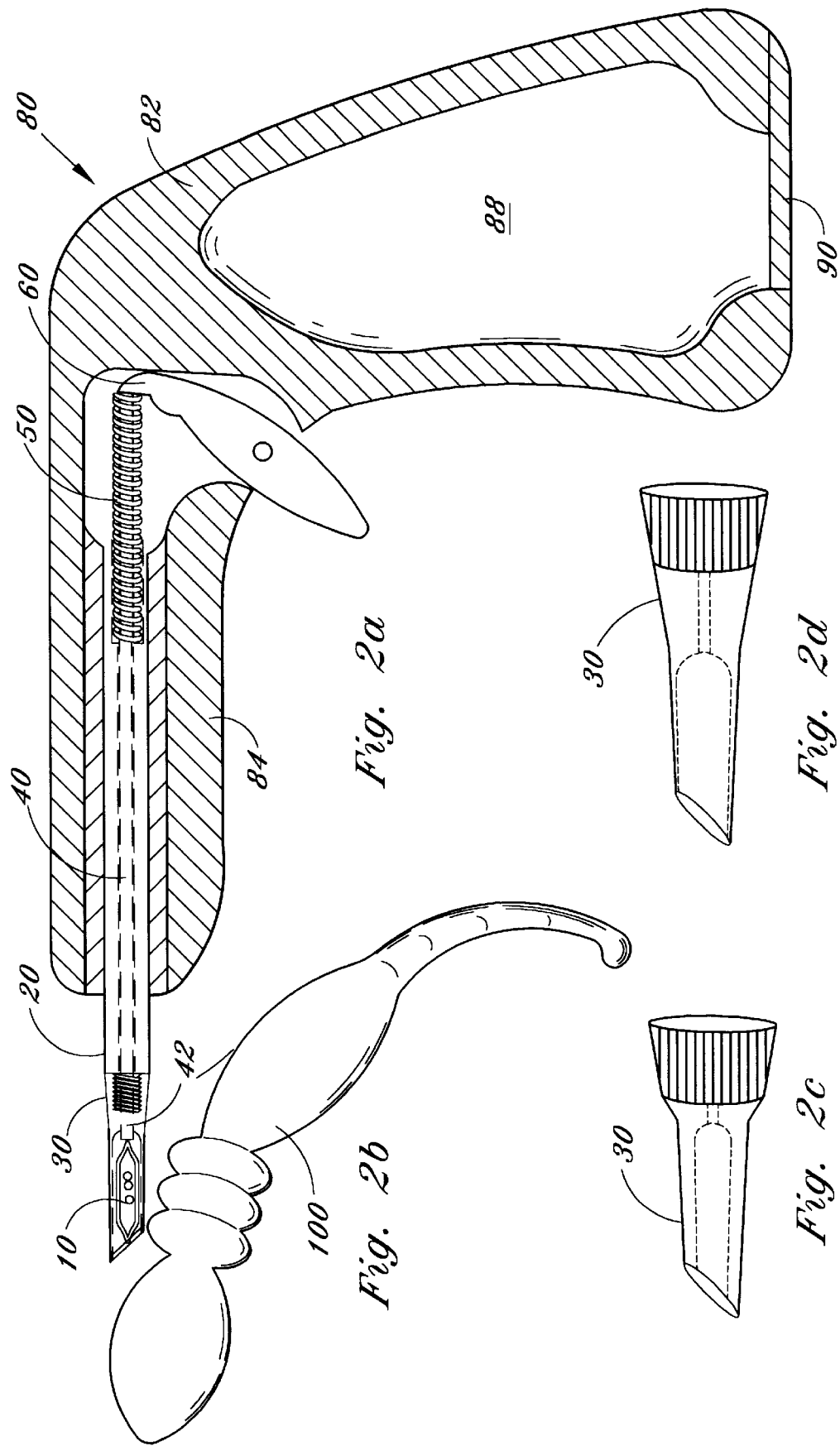
FIG. 2a depicts a partial sectional view of the present invention with the ejecting rod in a retracted position.
FIG. 2b depicts an artificial fishing lure.
FIG. 2c depicts a first size injecting tip for use with the present invention.
FIG. 2d depicts a second size injecting tip for use with the present invention.
Figure 3:
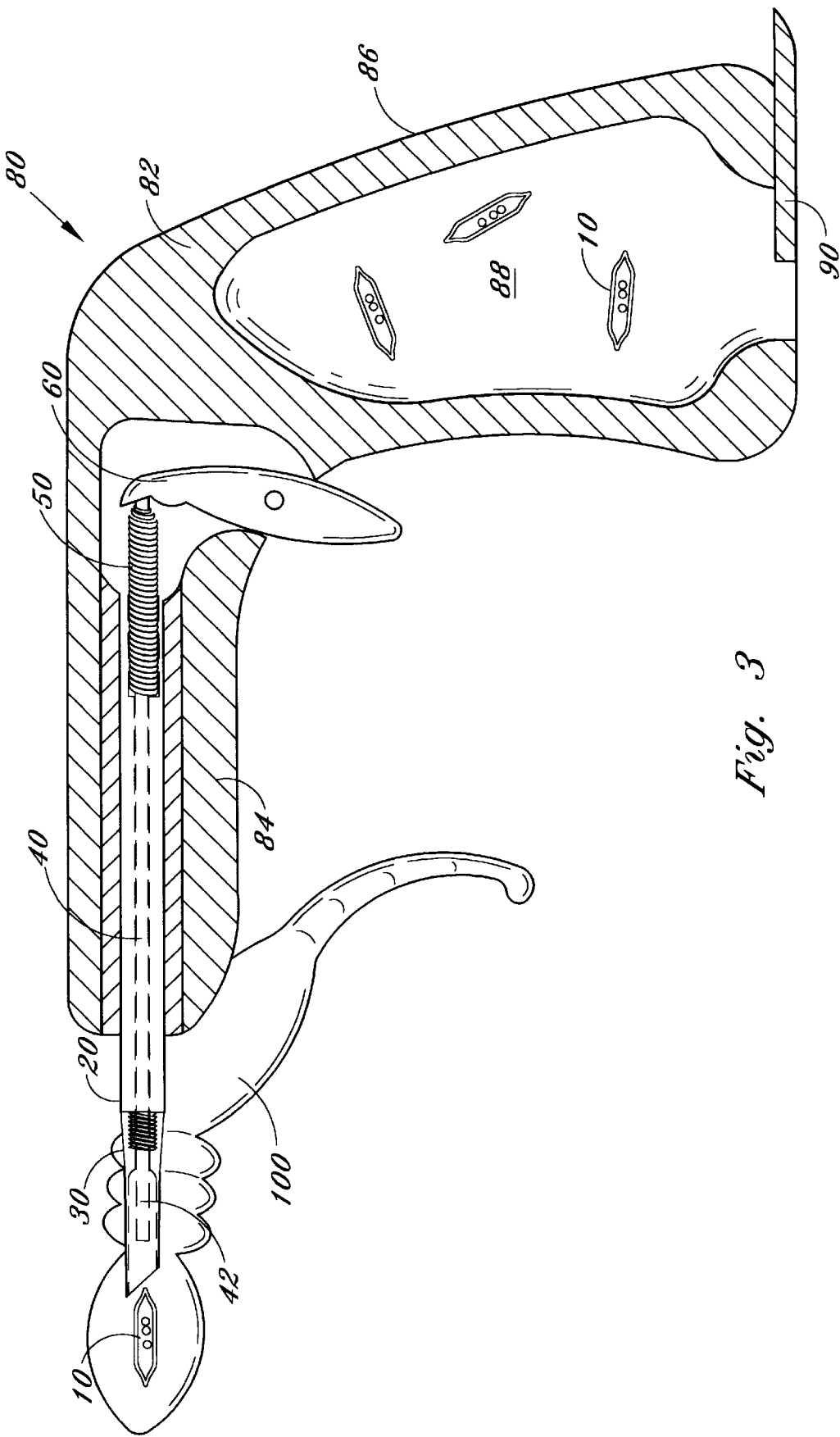
FIG. 3 depicts a partial sectional view of the present invention with the ejecting rod in an extended position.

Turning now to FIGS. 2a–d and 3, there is depicted a preferred embodiment of the injecting device of the present invention generally referenced as 80, in partial section, for injecting an object 10 into an artificial worm 100 in FIG. 2b. The device includes a means for grasping, which, comprises a structure shaped in the form of a hand gun housing 82, however, the present invention contemplates any suitable structural configuration. which allows for easy manipulation by hand. Housing 82 has a barrel portion 84, within which hollow shaft 20 is fixedly disposed such that threaded end 22 remains exposed external to barrel portion 84. As is depicted in FIGS. 2a and 3, the working components, as disclosed in exploded view in FIG. 1, are configured in an assembled form. In the instant embodiment, a trigger 60 functions as the actuating means for moving rod 40 from its normally retracted position, as seen in FIG. 2a, to its ejecting position, as seen in FIG. 3. Housing 82 further includes a grip portion 86 forming a means for grasping. Grip portion 86 defines an internal chamber 88 for use as a storage compartment for various objects such as rattling devices 10 or weights (not shown). A chamber door 90 provides access to internal chamber 88. Door 90 is slidable between a closed position, as seen in FIG. 2a, to an open position as seen in FIG. 3, for inserting or removing enclosed objects.

Figures 4, 5:
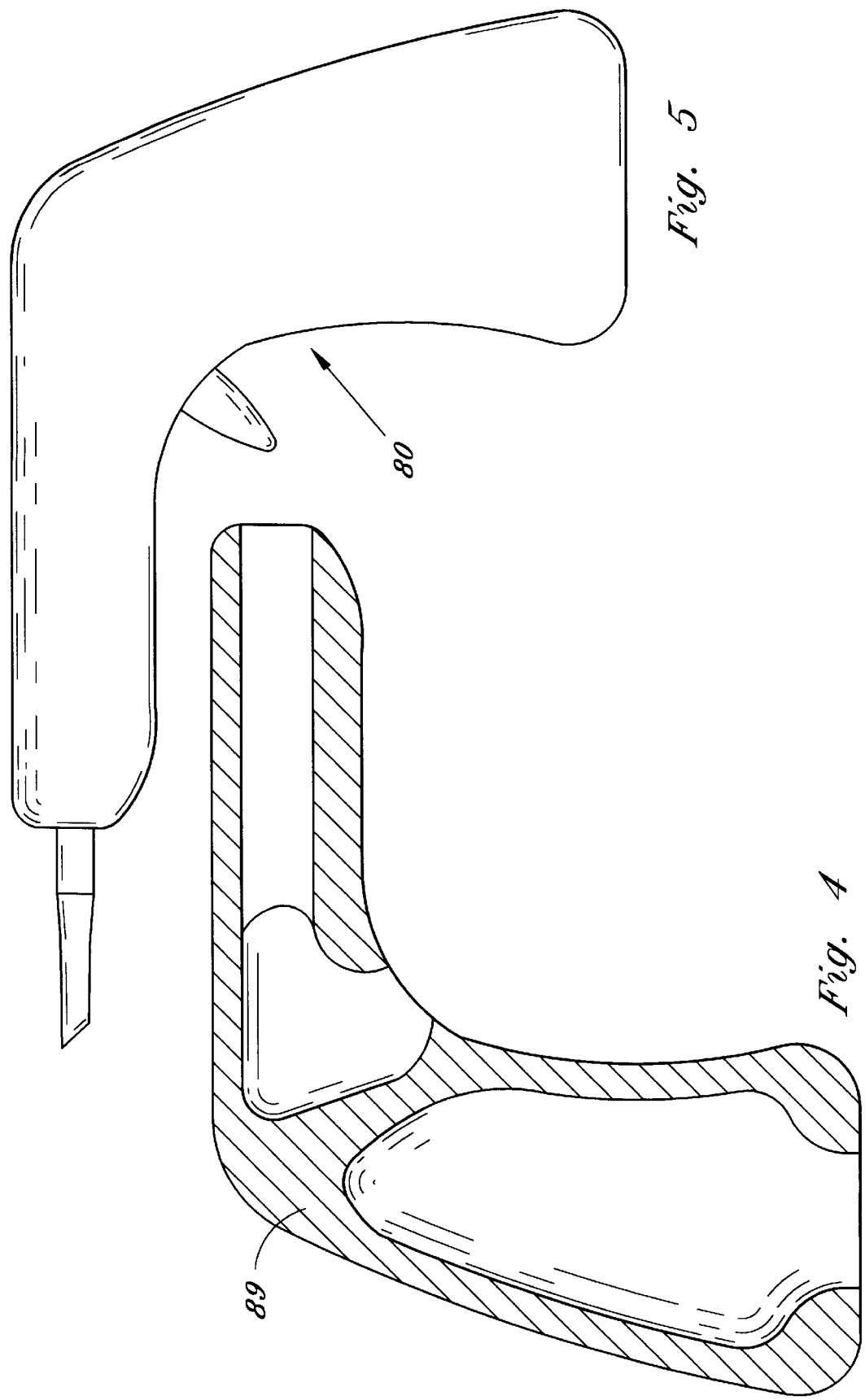
FIG. 4 depicts an opposing section for mating with the section seen in FIGS. 2 and 3.
FIG. 5 depicts the device shown in FIGS. 2–4 in its fully assembled configuration.

As the device depicted in FIGS. 2a and 3 is generally shown in sectional view, a mating section 89 is disclosed in FIG. 4, which, when combined with the sections depicted in FIGS. 2a or 3, forms the completed unit illustrated in FIG. 5.

As is now apparent, the present invention is used for injecting an object, such as a rattling device, into an artificial fishing lure, such as a plastic worm, as generally illustrated in FIG. 2a–d and 3. As seen in FIG. 2, the user selects an appropriate tip size, FIG. 2c and 2d, and threadably attaches the tip 30 to shaft 20, and inserts an object 10 is within tip 30. Tip 30 in FIG. 2c is sized for an object having a particular size, and tip 30 in FIG. 2d is sized for a larger object (e.g. larger weights, rattling devices, etc.). Although most objects 10 will be generally cylindrical, it is contemplated that tips 30 can have any suitable size and/or configuration for accommodating objects of various size and shape. The user then punctures a fishing lure 100 with tip 30 and, while simultaneously withdrawing tip 30, the user injects the object 10 by actuating trigger 60 thereby causing rod 40 to eject object 10 from the device such that the object remains embedded in the lure.

An alternate embodiment, generally referenced as 120, is disclosed in FIGS. 6 and 7. In the embodiment shown in FIGS. 6 and 7, the working components depicted in FIG. 1 are configured with a grasping means including a finger grip 130 fixedly disposed on shaft 20 between shaft ends 22 and 23. In addition, rod 40 includes a second end portion 44 which incorporates a surface 45, against which a user applies force for moving rod 40 from a retracted position as seen in FIG. 6, to an extended position as seen in FIG. 7.

As is now apparent, the present invention is used for injecting an object, such as a rattling device, into an artificial fishing lure, such as a plastic worm, as generally illustrated in FIGS. 6 and 7. With reference to FIG. 6, the user selects an appropriate tip size and threadably attaches the tip 30 to shaft 20, and an object 10 is inserted in tip 30. The user then punctures a fishing lure (not shown) with tip 30 and, while simultaneously withdrawing tip 30, the user injects the an object 10 by actuating rod 40 by applying force to surface 45 thereby ejecting object 10, such that the object remains embedded in the lure.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A method of enhancing an artificial fishing lure by injecting an object into the lure, said method including the steps of:

selecting an object for injection into said artificial fishing lure;

providing a plurality of variously sized piercing tips;

selecting one of said piercing tips for attachment to an injecting device, the selected piercing tip sized to correspond to said selected object;

removably mounting the selected piercing tip on said injecting device;

inserting said object at least partially within said tip;

puncturing an artificial fishing lure with said piercing tip;

withdrawing said piercing tip while simultaneously ejecting said object from said tip such that said object remains embedded within the lure.

2. A hand held apparatus for injecting an object into an artificial fishing lure, said apparatus comprising:

a hand gun-shaped housing having a barrel portion defining an elongated hollow shaft, and a grip portion;

said barrel portion having an end including means for removably mounting a tip thereon;

a plurality of various sized piercing tips, one of said piercing tips removably mounted on the end of said barrel portion end, said tip defining a bore therethrough in axial alignment with said hollow shaft, said tip defining an object receiving cavity;

a push rod movably received within said shaft, said rod having a first end disposed proximate said tip and in axial alignment with said tip bore, said rod biased to a retracted position by a spring, said rod movable from said retracted position, wherein an object may be at least partially received within said tip cavity, to an extended position wherein said rod end ejects said object from said tip cavity;

said push rod having a second end connected to a mechanical linkage, said mechanical linkage including a trigger portion projecting from said housing, said trigger portion movable from a first position wherein said push rod is in said retracted position, to a second position wherein said push rod is in said extended position;

said grip portion defining an internal chamber forming an object storage compartment and including a chamber door for providing access to said storage compartment.

3. A hand held apparatus for injecting an object into an artificial fishing lure, said apparatus comprising:

a housing defining an elongated hollow shaft;

a plurality of various sized piercing tips, one of said piercing tips removably mounted on one end of said housing, said tip defining a bore therethrough in axial alignment with said hollow shaft, said tip defining an object receiving cavity;

a push rod movably received within said shaft, said rod having a first end disposed proximate said tip and in axial alignment with said tip bore, said rod biased to a retracted position by a spring, said rod movable from said retracted position to an extended position wherein said rod end ejects an object received within said tip cavity;

said push rod having a second end projecting from said housing, said second end including an expanded portion defining a surface upon which a user applies a force for moving said push rod from said retracted position to said extended position;

a finger grip fixedly associated with said housing, said finger grip including opposing projecting members, whereby a user ejects an object from said tip by grasping said housing such that the user's fingers engage each of said projecting members and a portion of the user's hand applies force to said push rod second end surface.

4. A hand held apparatus according to claim 3, wherein each of said tips include a substantially cylindrical end portion terminating in a sharpened beveled piercing end, said cylindrical end portion defining said cavity for receiving an object removably inserted therein.

5. A hand held apparatus according to claim 3, wherein said object comprises a substantially cylindrical rattling device.

6. A hand held apparatus according to claim 3, wherein said object comprises a metal weight.

* * * * *